UNITED STATES PATENT OFFICE.

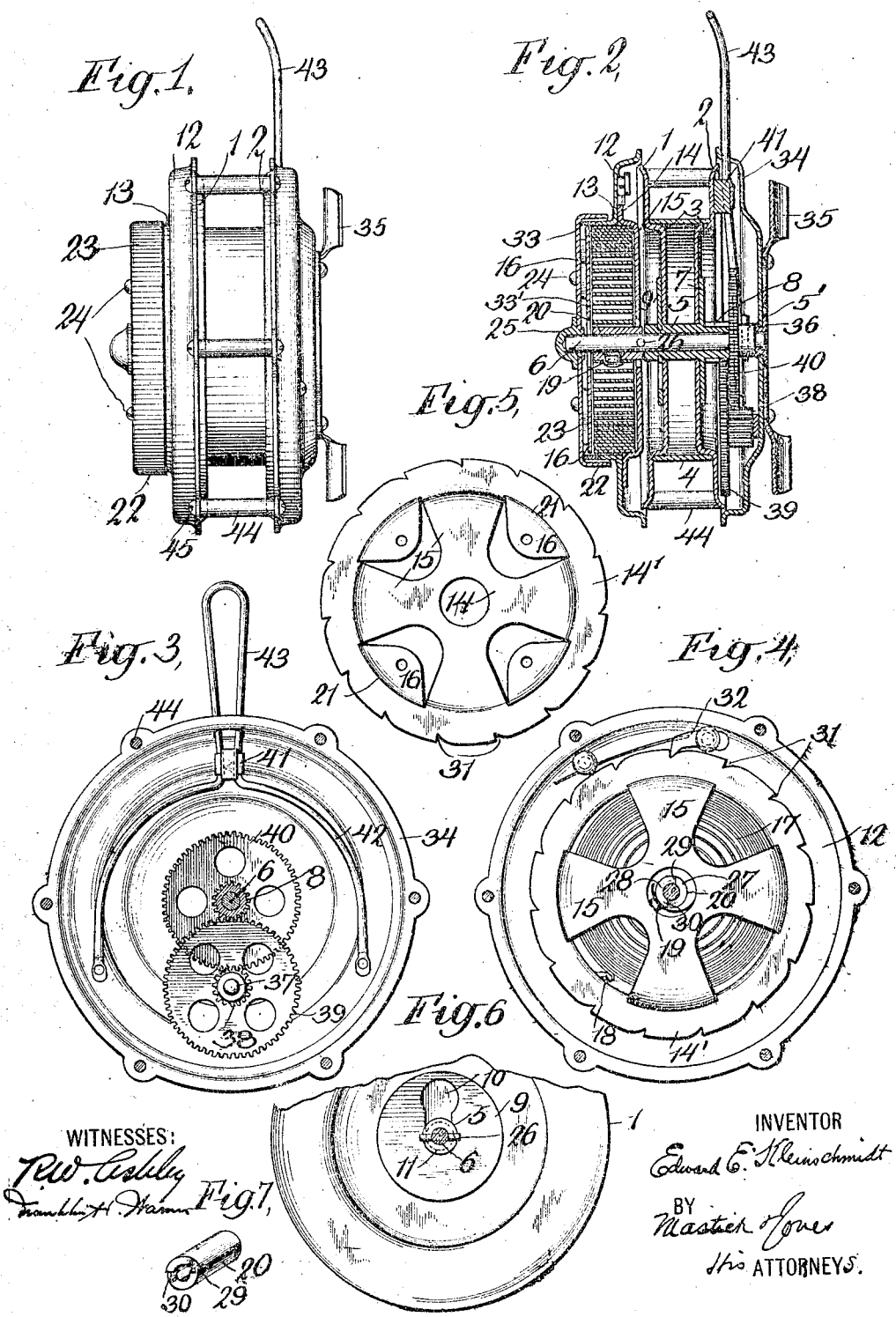

EDWARD E. KLEINSCHMIDT, OF NEW YORK, N. Y.

FISHING-REEL.

No. 871,346.　　　　Specification of Letters Patent.　　　　Patented Nov. 19, 1907.

Application filed July 24, 1906. Serial No. 327,514.

*To all whom it may concern:*

Be it known that EDWARD. E. KLEINSCHMIDT, a citizen of the United States, residing at New York city, in the county of New York and State of New York, has invented certain new and useful Fishing-Reels, of which the following is a specification.

The present invention relates to a fishing reel the primary object being to provide a reel in which the line spool may be rotated independently of the main spring and reducing gears to facilitate paying out when the spring is completely wound.

Another object of the invention is to provide a reel in which such independent rotation of the line spool may be effected without throwing out of engagement any of the gears of the reducing train or otherwise disturbing the normal relation of the several parts of the reel.

A further object of the invention is to group the line spool, main spring and reducing gears in operative relation by a yielding clutch so as to prevent undue strain upon the main spring due to the inertia of the spool when the spring is completely unwound.

The invention will be understood by reference to the accompanying drawings in which Figure 1 is a vertical side elevation of a reel embodying my invention; Fig. 2 a central vertical section thereof; Fig. 3 is a view in elevation of the inside cover plate of the right hand section of the reel; Fig. 4 is an elevation of the spring containing case and the cover plate therefor; Fig. 5 is a face view of the opposite side of the spring containing case seen in Fig. 4; Fig. 6 a face view partly broken away of one end of the line spool to show the friction disk thereon, and Fig. 7 a perspective of the collar to which the inner end of the main spring is connected.

Similar numerals of reference indicate similar parts throughout the several views.

The present reel comprises three main sections, namely a line spool, the spring containing case, and the gearing case. These parts are constructed and assembled as follows: The spool comprises two similar circular end sections 1 and 2 which may be stamped out of light sheet metal, preferably aluminium, each of said sections having a central depression to form annular shoulders 3. Seated upon said shoulders is a cylindrical base 4 on which the line is wound said line being confined between the peripheral walls of sections 1 and 2 above said face. The spool thus constituted bears on a collar 5 through which loosely passes a shaft 6. As indicated in Fig. 2 the collar 5 has formed integral therewith, or fixedly secured thereto, a disk 7 and a pinion 8, said disk being adapted to frictionally engage the outer wall of the central depressed portion of section 2 of the spool. Engaging the outer wall of section 1 of the spool in a similar manner is a disk 9 which, as shown in Fig. 6, is provided with a key slot 10 by which it is made to engage a circumferential groove 11 in collar 5. The groove 11 is so placed that when disk 10 is slipped into position it and disk 7 will bear against the spool with sufficient pressure to effect the rotation of the spool when the latter is released and the spring unwinding, and will permit the rotation of the spool independently of the gears when the spring is completely wound for the purpose of drawing off the line.

The division of the reel containing the winding spring comprises an annular section 12 having a downwardly projecting flange 13. Seated in the central opening of said annular section is a spring containing case 14 preferably made of sheet metal and stamped by suitable dies to the form shown in Figs. 4 and 5. That is the central body portion of said casing is cut and pressed outwardly on one side from the peripheral flange 14' to provide diametrical webs 15. The cut-out sections are then pressed outwardly on the other side of said flange to provide diametrically disposed ears 16, the space between said webs and ears constituting a pocket adapted to receive a coiled spring 17. The precise design followed in forming the spring containing case is immaterial so long as there is secured a pocket of suitable width to accommodate the spring. The outer end of spring 17 is attached at 18 to the flange 14' and the other end is secured at 19 to a collar 20 which has a loose bearing on shaft 6. The flange 13 of the annular section 12 bears loosely on the concentric projecting walls 21 of ears 16. Surrounding the flange 13 and preferably not in contact therewith is the depending flange 22 of a cap 23. Fixed in a centrally disposed opening in said cap is a bearing 25 for one end of shaft 6. Cap 23 is secured to the ears 16 of the spring case by means of screws 24.

As shown in Figs. 2 and 6 a pin 26 passes through an opening in shaft 6 immediately beyond the inner end of collar 5, and as shown in Figs. 4 and 7 the inner end of collar 20 is formed with two oppositely disposed cams 27 and 28, a clear diametrical passage between the high points 29 and 30 of said cams being provided for the reception of said pin. The end of collar 20 so formed constitutes a clutch, the pin 26 being held in engagement therewith by the lateral pressure of the end of spring 17. By reason of the union of cap 23 and the spring case 14 and the relation of the parts just described, the spring may be wound by turning said cap, it being observed that at such time the collar 20 is held against rotation by the interlocking pin 26 between said collar and shaft 6. To prevent a reverse movement of the spring while winding I cut the edge of the peripheral flange 14' of the spring case with ratchet teeth 31, and pivot on the inner wall of the annular section 12 a spring pressed back lash pawl 32 adapted to engage said teeth.

A collar 33 may be placed around the ears 16, said collar abutting against the edge of flange 13 as indicated in Fig. 2. A fiber washer 33' may be placed over spring 17 to protect it.

The third division of the reel or that inclosing the reducing train of gears comprises an end plate or cover 34 which may be conveniently stamped up from sheet metal to the form indicated in Fig. 2, the reel seat 35 being secured thereto. Fixed in an opening in said plate is a bearing 36 for one end of shaft 6. A collar 5' keyed to said shaft abuts against the bearing 36 and prevents any endwise movement of the shaft. Loosely mounted on a stub shaft 37 (see Fig. 3) projecting from a bracket secured to the inner wall of plate 34 is a pinion 38 which pinion is fast on the side of a spur gear 39. The pinion 38 is shown in dotted lines in Fig. 3 as it lies back of the gear 39. Said pinion meshes with a gear wheel 40 keyed to shaft 6, and gear wheel 39 meshes with pinion 8 which, as before stated, is fast with collar 5 and loose on shaft 6.

Bearing against the peripheral wall of section 2 of the spool is a brake shoe 41 carried by a spring arm 42 which may be bent to the form indicated in Fig. 3, the ends of said arm being secured to the cover plate 34. The handle 43 of the brake-arm passes upwardly through an opening in plate 34 so as to be accessible to the user. Said handle is capable of lateral movement in the opening in plate 34 so as to permit the release of the spool from the brake.

The assemblage of the reel is completed by tie rods 44 the ends of which are tapped to receive screws 45 passing through openings in the rims of section 12 and cover plate 34.

The operation of the described reel is as follows: When the spring is to be wound the user turns cap 23 to the right and as said cap is connected to spring case 14 said case will also be turned. At such time the clutch end of collar 20 holds the latter stationary by reason of its engagement with pin 26 on shaft 6, said pin bearing against the vertical walls of the high points of the cams 27 and 28. When the reel is in use for its intended purpose the present construction permits the running off of the line by hand when the spring is completely wound without danger of breaking or straining any of the parts and without throwing out of engagement any of the gears of the reducing train. This is due to the use of the friction disks 7 and 9 which engage the spool sections 1 and 2. When the line is drawn off the spool will be rotated on its bearing on collar 5 and caused to slide over the faces of said disks. At such time the brake 41 may or may not be released. If the brake is released care should be taken to maintain a hold on the line to prevent the spring 17, should it be wound, imparting a reverse movement to the spool. It will be noted that in this operation the function of the friction disks 7 and 9 is to permit the spool to be rotated and the line drawn off when the spring is completely wound and that in such operation the train of gears is not disturbed, and special provision for mounting the spring 17, such as its disengagement at one end, is unnecessary.

In the handling of the reel when exhibiting it to others, and even when in use, the inertia of the line spool when turned by the spring in a direction to wind the line is considerable. If a sudden check is placed upon the spool at the moment that the spring becomes completely unwound it is apt to put a severe strain upon the spring sufficient to cause it to buckle. To avoid this is the function of the clutch connection between collar 20 and pin 26. In the reel described should the spring be wound and the spool then released from brake 41 so as to permit a rapid rotation thereof, the inertia of the spool may be expended until it comes to rest without in any way affecting the spring. When the spring becomes completely unwound the spool continues to rotate by reason of its inertia, the pin 26 at such time riding over the two cams 27 and 28 until the spool comes to a state of rest when said pin will be seated in the diametrical passage between the high points of said cams. It will thus be readily seen that when the spool is rotated to draw in the line there will be no strain whatever upon the spring for it has become completely unwound. It will be understood of course that during this winding operation the spool will be rotated through collar 20, shaft 26, gear 40, which is keyed to said shaft, collar 5 and friction disks 7 and 9. Also that when the spring is either completely unwound or partly wound the drawing off of the line by hand will effect the winding of the spring, and when the latter is completely wound the line may continue to be drawn off as above described.

What I claim and desire to secure by Letters Patent of the United States is:—

1. In a fishing reel the combination of a line spool, a spring adapted when unwinding to rotate said spool in a direction to draw in the line, and means intermediate said spring and spool to automatically disconnect them to permit the spool to continue to rotate by reason of its inertia when the spring is completely unwound.

2. In a fishing reel the combination of a line spool, a shaft on which said spool is mounted, a spring adapted to rotate said shaft and spool in a direction to draw in the line, and means connecting one end of said spring with the shaft to hold the former stationary when the spring is being wound and to automatically disconnect the spring and shaft to permit the spool to continue to rotate by reason of its inertia when the spring is completely unwound.

3. In a fishing reel the combination of a line spool, a shaft on which said spool is mounted, a spring adapted to rotate said shaft and spool in a direction to draw in the line, and a yielding clutch connecting one end of said spring and said shaft to hold the former stationary when the spring is being wound and to automatically disconnect the spring and shaft to permit the spool to continue to rotate due to its inertia when the spring is completely unwound.

4. In a fishing reel the combination of a line spool, a spring adapted to rotate said spool in one direction, a casing inclosing said spring and to which it is connected at one end, a shaft on which said spool is mounted, a collar having a loose bearing on said shaft and to which the other end of said spring is connected, means for rotating said casing to thereby wind the spring, and means between said collar and shaft adapted to hold the former stationary when the spring is being wound and which will permit the shaft and spool to continue to rotate when the spring is completely unwound.

5. In a fishing reel the combination of a line spool, a spring adapted to rotate said spool, a shaft on which said spool is mounted, a collar having a loose bearing on said shaft to which one end of the spring is connected, said collar constituting a clutch member adapted to engage said shaft to prevent movement of the collar when the spring is being wound, and to cause a rotation of the shaft and spool when the spring is unwinding, and to permit of the continued rotation of said shaft and spool due to their inertia when the spring is completely unwound.

6. In a fishing reel the combination of a line spool, a spring adapted to rotate said spool, a shaft on which said spool is mounted, a collar having a loose bearing on said shaft to which one end of the spring is connected, one end of said collar having cam surfaces cut thereon, a pin on said shaft adapted to engage said cams in such manner as to lock said shaft and collar together to hold said collar stationary when the spring is being wound, and to ride over the faces of said cams when the spring is completely unwound so as to permit the continued rotation of said shaft and spool without disturbing said spring.

7. In a fishing reel the combination of a line spool, a spring adapted when unwinding to rotate said spool in a direction to draw in the line, means intermediate said spring and spool which will permit the line to be drawn off when the spring is completely wound without disturbing said spring, and means to automatically disconnect the spring and spool to permit the latter to continue to rotate by reason of its inertia in said first-named direction when the spring is completely unwound.

8. In a fishing reel the combination of a line spool, a spring adapted when unwinding to rotate said spool in a direction to draw in the line, said mechanism comprising disks in constant frictional engagement with the spool, said disks permitting the line to be drawn off when the spring is completely wound without disturbing the latter, and means intermediate said spring and spool which will automatically disconnect them to permit the spool to continue to rotate by reason of its inertia in said first-named direction when the spring is completely unwound.

9. In a fishing reel the combination of a line spool, a collar carrying friction disks which engage said spool, a shaft on which said collar has a loose bearing, a train of gears the extremes of which are fixed respectively to said shaft and collar, a spring adapted to rotate said shaft and spool in a direction to draw in the line, whereby by reason of said disks the spool may be rotated in an opposite direction when the spring is wound without disturbing said shaft, spring or gears, and a connection between said spring and shaft which will automatically disconnect them to permit the shaft and spool to continue to rotate by reason of their inertia when the spring is completely unwound.

10. In a fishing reel the combination of a line spool, a spring adapted to rotate said spool in one direction, a casing inclosing said spring and to which it is connected at one end, a shaft on which said spool is mounted, a collar having a loose bearing on said shaft and to which the other end of said spring is connected, means for rotating said casing to wind the spring, and means for holding said collar stationary while the spring is being wound.

11. In a fishing reel the combination of a line spool, a shaft passing centrally through said spool, friction disks having a loose bearing on said shaft and engaging said spool, one of said disks having a key slot by which it is adapted to be secured to said shaft, and means to rotate said shaft.

12. A fishing reel comprising a casing, a spring secured at one end to said casing, a loose member to which the other end of said spring is connected, means to rotate said casing to wind the spring, and means to hold said member stationary while the spring is being wound.

13. A fishing reel comprising a spring casing formed of a single piece having its body portion cut and sections thereof pressed outwardly on opposite sides to provide a pocket for the reception of the spring.

14. A fishing reel comprising a spring casing formed of a single piece having a body portion and a peripheral flange, said body portion being cut and sections thereof pressed outwardly on opposite sides to provide a pocket for the reception of the spring, and said flange provided with ratchet teeth adapted to be engaged by a pawl to prevent a reverse movement of the spring.

15. A fishing reel comprising a spring casing formed of a single piece having a body portion and a peripheral flange, said body portion being cut and sections thereof pressed outwardly on opposite sides to provide a pocket for the reception of the spring, and said flange provided with ratchet teeth, a cover for said casing, a pawl carried by said cover adapted to engage said teeth to prevent a reverse movement of the spring, and a spring winding cap secured to said casing.

16. In a fishing reel the combination of a line spool, a collar carrying friction disks which engage the sides of said spool, one of said disks being integral with said collar and the other removably secured thereto, a shaft on which said collar has a loose bearing, a spring connected to said shaft adapted to rotate it in one direction, and a train of gears connecting said shaft and collar.

17. In a fishing reel the combination of a line spool, said spool comprising two side sections each having an inwardly projecting shoulder, a base seated upon said shoulder between the sections, a collar upon which said spool is mounted, friction disks engaging the sides of said spool, one of said disks being integral with said collar and the other removably secured thereto, a spring connected to said shaft adapted to rotate it in one direction, and a train of gears connecting said shaft and collar.

18. In a fishing reel the combination of a line spool, a shaft on which said spool is mounted, a spring adapted when unwinding to rotate said spool in a direction to draw in the line, a shaft to which one end of said spring is secured, said shafts being in alinement, and means connecting said shafts to hold the spring shaft stationary during the winding of the spring and to disconnect them to permit the spool to continue to rotate by reason of its inertia when the spring is completely unwound.

In testimony whereof I have hereunto signed my name in the presence of two subscribing witnesses.

EDWARD E. KLEINSCHMIDT.

Witnesses:
ROBERT W. ASHLEY,
CHARLES S. JONES.